(12) United States Patent
Rivera

(10) Patent No.: US 10,225,735 B2
(45) Date of Patent: Mar. 5, 2019

(54) SYSTEMS AND METHODS TO AUTHENTICATE USING VEHICLE

(71) Applicant: Lenovo (Singapore) Pte. Ltd., New Tech Park (SG)

(72) Inventor: David Rivera, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 213 days.

(21) Appl. No.: 15/252,434

(22) Filed: Aug. 31, 2016

(65) Prior Publication Data

US 2018/0063711 A1    Mar. 1, 2018

(51) Int. Cl.
*H04W 12/06*  (2009.01)
*H04L 9/32*  (2006.01)
*H04L 29/06*  (2006.01)
*H04W 4/80*  (2018.01)

(52) U.S. Cl.
CPC ........... *H04W 12/06* (2013.01); *H04L 9/3234* (2013.01); *H04L 9/3268* (2013.01); *H04L 9/3271* (2013.01); *H04L 63/0823* (2013.01); *H04W 4/80* (2018.02); *H04L 2209/80* (2013.01); *H04L 2209/84* (2013.01)

(58) Field of Classification Search
CPC ..................................................... H04W 12/06
USPC ......................................................... 713/168
See application file for complete search history.

(56) References Cited

U.S. PATENT DOCUMENTS

| | | | | |
|---|---|---|---|---|
| 2004/0003252 A1* | 1/2004 | Dabbish | ................. | B60R 25/04 713/175 |
| 2005/0060069 A1* | 3/2005 | Breed | ................. | B60N 2/2863 701/408 |
| 2005/0289345 A1* | 12/2005 | Haas | ....................... | G09C 5/00 713/170 |
| 2007/0200671 A1* | 8/2007 | Kelley | ................. | B60R 25/257 340/5.72 |

* cited by examiner

*Primary Examiner* — Jacob Lipman
(74) *Attorney, Agent, or Firm* — John L. Rogitz; John M. Rogitz

(57) ABSTRACT

In one aspect, a vehicle includes an engine, a drive train and chassis, a battery, a wireless transceiver, and a vehicle computing system that controls the engine, drive train, chassis, battery, and wireless transceiver. The vehicle computing system includes a cryptographic processor that has program instructions to communicate with a device separate from the vehicle to provide authentication information to the device via the wireless transceiver.

20 Claims, 6 Drawing Sheets

SYSTEMS AND METHODS TO AUTHENTICATE USING VEHICLE

FIELD

The present application relates generally to systems and methods to perform authentication using a vehicle.

BACKGROUND

As technology progresses, so do malicious hackers seeking to exploit technological vulnerabilities after getting past inadequate authentication safeguards. However, there still exists a need to securely authenticate people to computer systems for things such as banking transactions, dispensing physician-prescribed medication, etc.

SUMMARY

Accordingly, in one aspect a vehicle includes an engine, a drive train and chassis, a battery, a wireless transceiver, and a vehicle computing system that controls the engine, drive train, chassis, battery, and wireless transceiver. The vehicle computing system includes a cryptographic processor that has program instructions to communicate with a device separate from the vehicle to provide authentication information to the device via the wireless transceiver.

In another aspect, a method includes disposing a cryptographic processor on a vehicle and providing program instructions for the cryptographic processor to provide, via the vehicle, authentication information to a device separate from the vehicle.

In still another aspect, a computer readable storage medium (CRSM) that is not a transitory signal includes instructions executable by a processor to receive information associated with a vehicle and perform authentication based on the information.

The details of present principles, both as to their structure and operation, can best be understood in reference to the accompanying drawings, in which like reference numerals refer to like parts, and in which:

DETAILED DESCRIPTION

Figure 1:
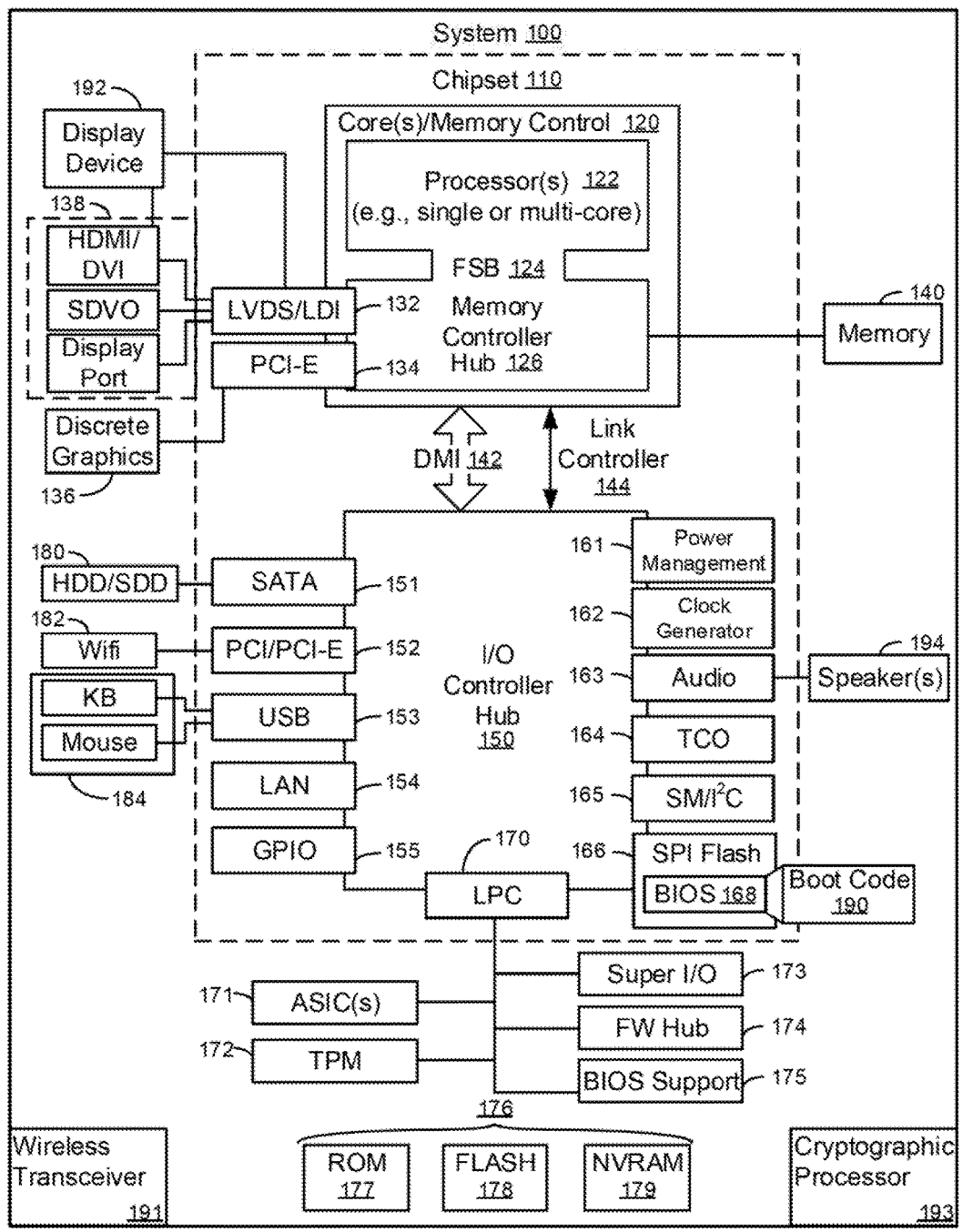
FIG. 1 is a block diagram of an example system in accordance with present principles.

The detailed description below pertains to, among other things, using a security token and/or cryptographic processor disposed in a vehicle for authentication to an establishment device such as a bank's automatic teller machine (ATM) and/or a retailer's device for authentication during a credit card transaction. For example, in one embodiment a smart card or Trusted Platform Module (TPM) chip may be affixed to a vehicle, coupled to the vehicle's onboard computing system, and accessed wirelessly using wireless communication between the vehicle and establishment's device.

The user may register the vehicle during an initial visit to the establishment. For example, during registration, the establishment's device may send a request to the smart card/TPM chip for the smart card/TPM chip to create a cryptographic key pair to be associated with the establishment, and then one of the keys from the pair being transmitted back to the establishment's device for that device to store it in a secure location accessible to the establishment's device.

On a subsequent visit to the establishment by the user using his or her vehicle, the establishment's device may determine that the user was previously registered, and transmit a random challenge to the vehicle's smart card/TPM chip. The vehicle's smart card/TPM chip may then sign a response to the challenge with an embedded private key from the key pair and send the response to the establishment's device, which may then validate the challenge with a public key reciprocal to the private key.

Thus, in the retailer example noted above, authentication using the user's vehicle in accordance with present principles may be used in addition to receiving a customer's signature and/or PIN during a credit card transaction to purchase goods so that the vehicle may be securely authenticated to validate that the payment is being done from a previously-registered vehicle.

With respect to any computer systems discussed herein, a system may include server and client components, connected over a network such that data may be exchanged between the client and server components. The client components may include one or more computing devices including televisions (e.g., smart TVs, Internet-enabled TVs), computers such as desktops, laptops and tablet computers, so-called convertible devices (e.g., having a tablet configuration and laptop configuration), and other mobile devices including smart phones. These client devices may employ, as non-limiting examples, operating systems from Apple, Google, or Microsoft. A Unix or similar such as Linux operating system may be used. These operating systems can execute one or more browsers such as a browser made by Microsoft or Google or Mozilla or another browser program that can access web pages and applications hosted by Internet servers over a network such as the Internet, a local intranet, or a virtual private network.

As used herein, instructions refer to computer-implemented steps for processing information in the system. Instructions can be implemented in software, firmware or hardware, or combinations thereof and include any type of programmed step undertaken by components of the system; hence, illustrative components, blocks, modules, circuits, and steps are sometimes set forth in terms of their functionality.

A processor may be any conventional general purpose single- or multi-chip processor that can execute logic by means of various lines such as address lines, data lines, and control lines and registers and shift registers. Moreover, any logical blocks, modules, and circuits described herein can be implemented or performed with a general purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

Software modules and/or applications described by way of flow charts and/or user interfaces herein can include various sub-routines, procedures, etc. Without limiting the disclosure, logic stated to be executed by a particular module can be redistributed to other software modules and/or combined together in a single module and/or made available in a shareable library.

Logic when implemented in software, can be written in an appropriate language such as but not limited to C# or C++, and can be stored on or transmitted through a computer-readable storage medium (e.g., that is not a transitory signal) such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

The term "circuit" or "circuitry" may be used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Now specifically in reference to FIG. 1, an example block diagram of an information handling system and/or computer system 100 is shown that is understood to have a housing for the components described below. Note that in some embodiments the system 100 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a client device, a server or other machine in accordance with present principles may include other features or only some of the features of the system 100. Also, the system 100 may be, e.g., a game console such as XBOX®, and/or the system 100 may include a wireless telephone, notebook computer, and/or other portable computerized device.

As shown in FIG. 1, the system 100 may include a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the conventional "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 can further include a low-voltage differential signaling interface (LVDS) 132. The LVDS 132 may be a so-called LVDS Display Interface (LDI) for support of a display device 192 (e.g., a CRT, a flat panel, a projector, a touch-enabled display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (×16) PCI-E port for an external PCI-E-based graphics card (including, e.g., one of more GPUs). An example system may include AGP or PCI-E for support of graphics.

In examples in which it is used, the I/O hub controller 150 can include a variety of interfaces. The example of FIG. 1 includes a SATA interface 151, one or more PCI-E interfaces 152 (optionally one or more legacy PCI interfaces), one or more USB interfaces 153, a LAN interface 154 (more generally a network interface for communication over at least one network such as the Internet, a WAN, a LAN, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes BIOS 168 and boot code 190. With respect to network connections, the I/O hub controller 150 may include integrated gigabit Ethernet controller lines multiplexed with a PCI-E interface port. Other network features may operate independent of a PCI-E interface.

The interfaces of the I/O hub controller 150 may provide for communication with various devices, networks, etc. For example, where used, the SATA interface 151 provides for reading, writing or reading and writing information on one or more drives 180 such as HDDs, SDDs or a combination thereof, but in any case the drives 180 are understood to be, e.g., tangible computer readable storage mediums that are not transitory signals. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices in accordance with present principles. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

Additionally, the system 100 may include at least one wireless communication transceiver 191 in accordance with present principles, such as a Bluetooth transceiver for Bluetooth communication, a near field communication (NFC) transceiver for NFC communication, a Wi-Fi transceiver for Wi-Fi direct communication, etc. The system may also include at least one secure cryptographic processor 193 for outputting encrypted data. The cryptographic processor 193 may be embodied in a smart card, a Trusted Platform Module (TPM) such as a TPM 2.0, a security chip, an integrated circuit card, another hardware security module, etc.

Additionally, though not shown for clarity, in some embodiments the system 100 may include a gyroscope that senses and/or measures the orientation of the system 100 and provides input related thereto to the processor 122, an accelerometer that senses acceleration and/or movement of the system 100 and provides input related thereto to the processor 122, an audio receiver/microphone that provides input from the microphone to the processor 122 based on audio that is detected, such as via a user providing audible input to the microphone, and a camera that gathers one or more images and provides input related thereto to the processor 122. The camera may be a thermal imaging camera, a digital camera such as a webcam, a three-dimensional (3D) camera, and/or a camera otherwise integrated into the system 100 and controllable by the processor 122 to gather pictures/images and/or video. Still further, and also not shown for clarity, the system 100 may include a GPS transceiver that is configured to receive geographic position information from at least one satellite and provide the information to the processor 122. However, it is to be understood that another suitable position receiver other than a GPS receiver may be used in accordance with present principles to determine the location of the system 100.

It is to be understood that an example client device or other machine/computer may include fewer or more features than shown on the system 100 of FIG. 1. In any case, it is to be understood at least based on the foregoing that the system 100 is configured to undertake present principles.

Figure 2:
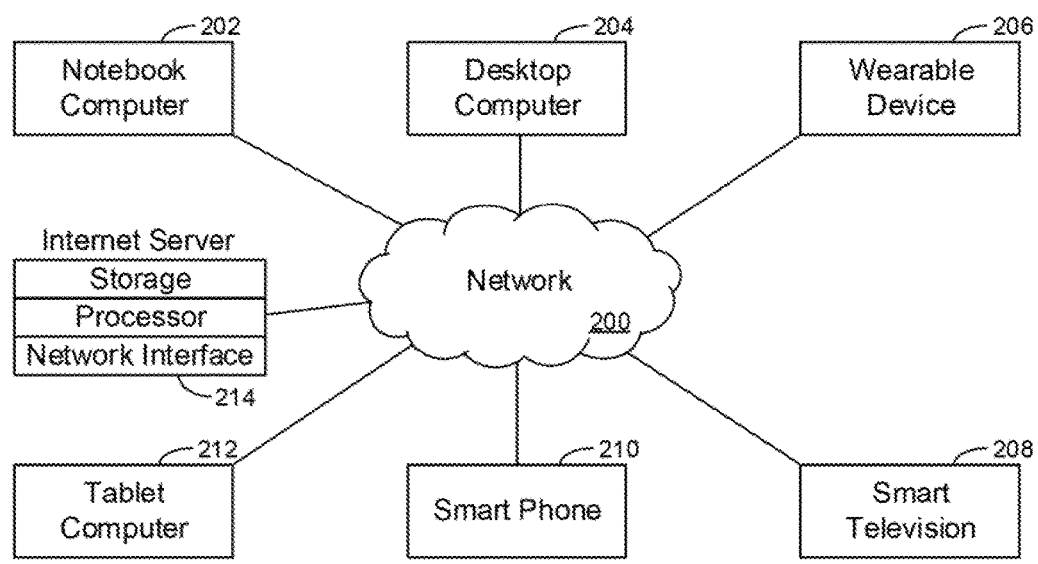
FIG. 2 is an example block diagram of a network of devices in accordance with present principles.

Turning now to FIG. 2, example devices are shown communicating over a network 200 such as the Internet in accordance with present principles. It is to be understood that each of the devices described in reference to FIG. 2 may include at least some of the features, components, and/or elements of the system 100 described above.

FIG. 2 shows a notebook computer and/or convertible computer 202, a desktop computer 204, a wearable device 206 such as a smart watch, a smart television (TV) 208, a smart phone 210, a tablet computer 212, and a server 214 such as an Internet server that may provide cloud storage accessible to the devices 202-212. It is to be understood that the devices 202-214 are configured to communicate with each other over the network 200 to undertake present principles.

Moving on from FIG. 2, it is to be understood that the description below refers to a bank and associated bank device (such as an ATM) as an example. However, it is to nonetheless be understood that present principles may apply in other instances as well to authenticate a user at least in part via his or her vehicle as set forth herein. For instance, a pharmacy is an example of another type of establishment that may use a device undertaking present principles to authenticate a user via his or her vehicle, as is a retail store with a drive-through window at which a credit card transaction using a credit card of the user may be performed responsive to authentication of the user/vehicle as set forth herein.

Figure 3:
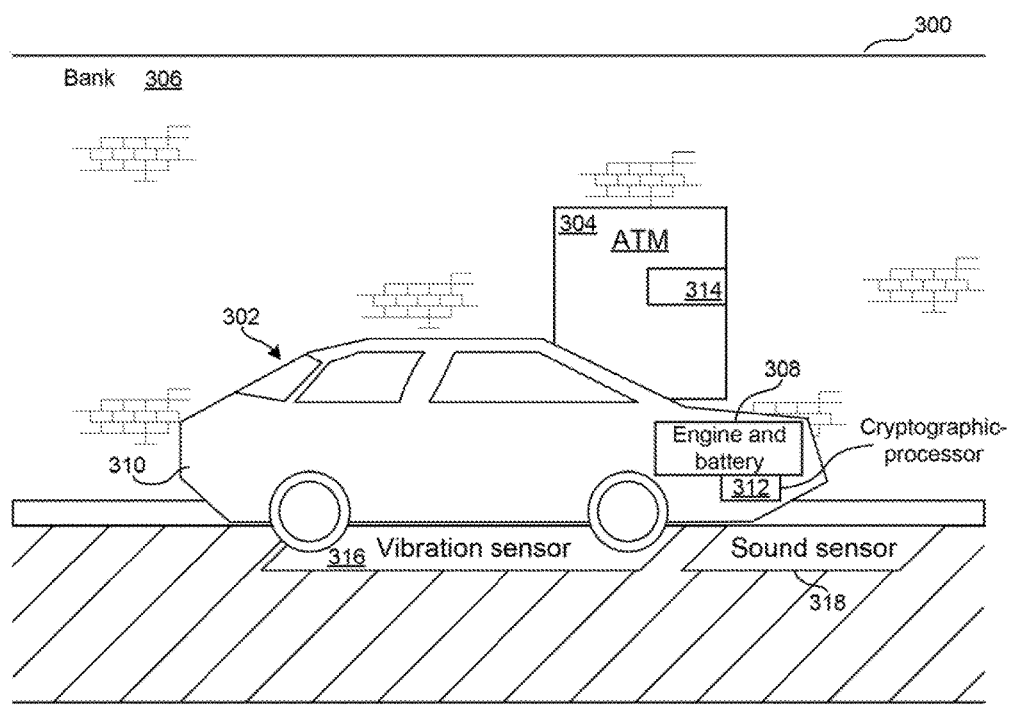
FIG. 3 is an example illustration in accordance with present principles.

Now referring to FIG. 3, it shows an illustration 300 in accordance with present principles. A vehicle 302 has driven up to an automatic teller machine (ATM) installed in the exterior of a bank 306. The vehicle 302 may include, among other things, an engine and battery 308, a drive train and chassis 310, a cryptographic processor 312 that may be similar to the cryptographic processor 193 described above, and a computing device (not shown for clarity) that may be similar to the system 100 described above and that may be in communication with the cryptographic processor 312. Additionally, and also not shown for clarity, both the ATM 304 (or another device associated with the bank 306) and vehicle 302 may include respective wireless communication transceivers similar to the transceiver 191 described above for communicating data between the bank 306 and vehicle 302 in accordance with present principles. Further, note that the ATM 304 may include a computing device 314 similar to the system 100 described above.

Additionally, it is to be understood that the ATM 304 may receive data from a vibration sensor 316 and sound sensor 318 disposed adjacent to the ATM 304 and in some examples installed on the driveway next to the ATM 304 underneath the vehicle 302 as shown in FIG. 3. The vibration sensor 316 may sense vibrations generated by the vehicle 302, while the sound sensor 318 may sense sounds generated by the vehicle 302. The vibrations and sounds may be generated specifically by the engine of the vehicle 302, for instance.

Thus, based on one or both of encrypted authentication data being provided by the cryptographic processor 312 to the ATM 304/bank 306, and/or based on data from the sensors 316 and 318, the vehicle 302 and/or a user associated therewith may be authenticated, as described further below.

However, first note that authentication of the user/vehicle 302 may be performed still other ways as well, such as using a camera disposed on the ATM 304/bank 306 to read the vehicle identification number (VIN) for the vehicle 302 (e.g., from the body of the vehicle 302) and/or the license plate number for the vehicle 302, and to authenticate that the detected/identified VIN and/or license plate number respectively match a pre-stored/registered VIN and license plate number. Additionally or alternatively, vehicle paint color as identified from images from the camera may also be used so that the user/vehicle 302 may be authenticated based on a detected/identified paint color matching a pre-stored/registered paint color for the user/vehicle 302.

Figure 4:
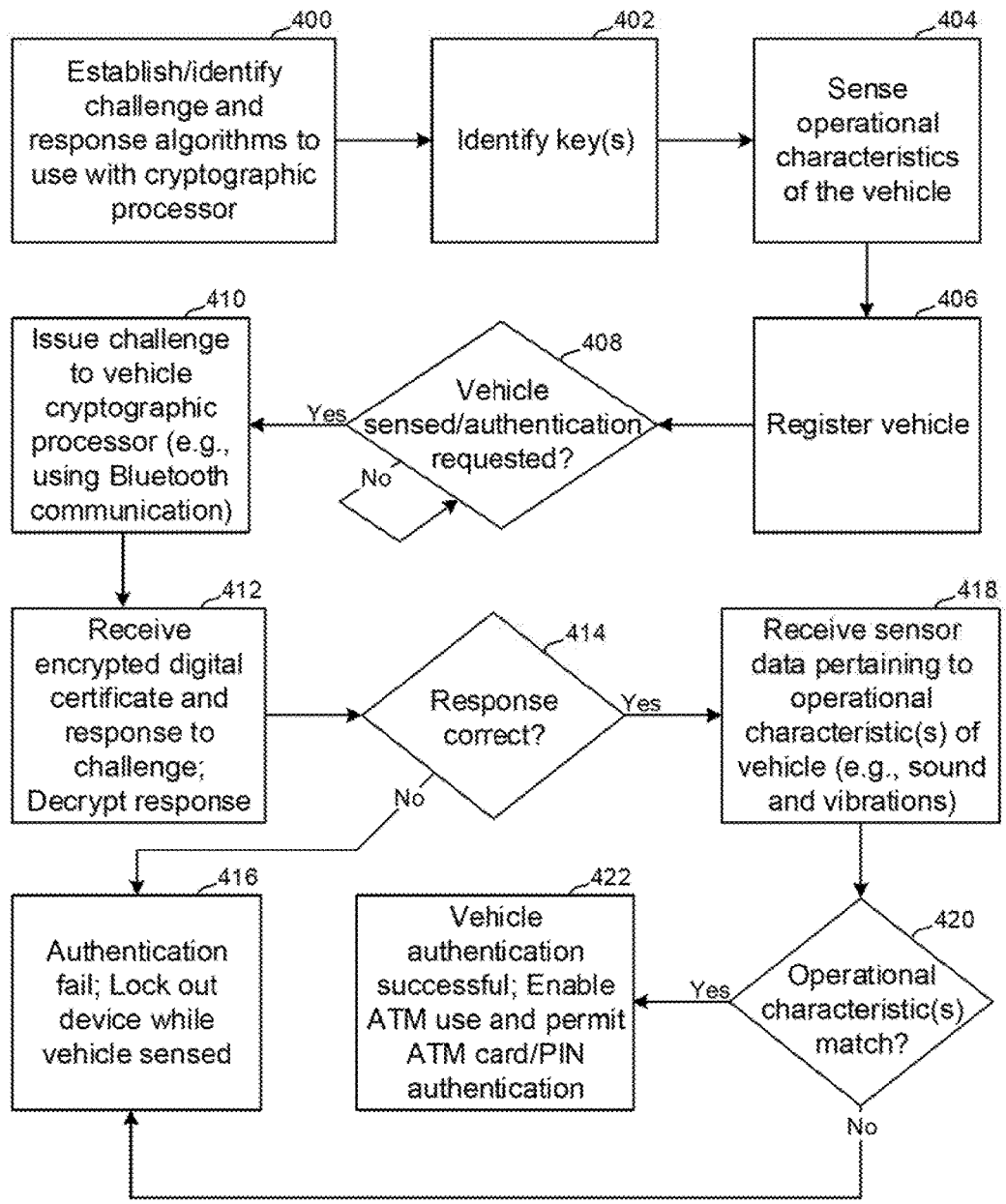
FIGS. 4 and 5 are flow charts of example algorithms in accordance with present principles.

Reference is now made to FIG. 4, which shows example logic that may be executed by a device such as the system 100 and that is associated with a bank in accordance with present principles (referred to when describing FIG. 4 as the "present device"). The present device may be an ATM such as the ATM 304 described above, or another device associated with the bank for undertaking present principles. It is to also be understood that the logic of FIG. 4 may be executed while a vehicle is present at or near the present device for communication therewith.

Beginning at block 400, the logic may select and/or identify a challenge algorithm to use and reciprocal challenge response algorithm for a cryptographic processor on a vehicle to use. The cryptographic processor may be disposed on the vehicle by bank personnel or may be disposed on the vehicle at manufacture of the vehicle.

In some examples, the cryptographic processor may store and/or support multiple different response algorithms. The response algorithms may be loaded onto the cryptographic processor at manufacturing of the cryptographic processor. The bank may be made aware of and store, for example, a published standard algorithm set for challenge algorithms that the bank may use in conjunction with the cryptographic processor's response algorithm(s), and accordingly the present device may identify one to use at block 400 to establish the authentication "handshake" between the present device and vehicle/cryptographic processor in accordance with present principles. Additionally or alternatively, the present device at block 400 may negotiate a particular algorithm set to use with the cryptographic processor based on one or more response algorithms stored on the cryptographic processor to establish the authentication "handshake". In some embodiments, the handshake may include one or more cryptographic algorithms that are supported by the cryptographic processor so the present device and cryptographic processor can agree on a particular cryptographic protocol to use, such as RSA or ECC.

In any case, it is to be understood that during operation, the cryptographic processor may execute the response algorithm to respond to a challenge received from the present device that the present device generated using the challenge algorithm so that the vehicle and/or associated user may be authenticated in accordance with present principles. For example, the response algorithm may be to reverse an order of a number sequence generated randomly by the challenge algorithm. E.g., if the number sequence 1, 2, 3, is provided to the cryptographic processor as a challenge, the cryptographic processor may execute the response algorithm to output a response of 3, 2, 1. The same algorithm set may be used so that, for example, the cryptographic processor may receive the sequence 4, 5, 6 as a challenge from the present device and execute the challenge response algorithm to output a response of 6, 5, 4.

Another challenge/response mechanism that may be used includes having the present device create a random number each time the user visits/engages with a device associated with the establishment (such as the present device itself), and then having the vehicle/cryptographic processor digitally sign the random challenge response with its private key. The signed response would be sent back to the device for validation, which could be done because the establishment had previously stored the vehicle's public key during registration, as discussed below.

Thus, after establishing/identifying the algorithm(s) to use, the logic may move to block 402. At block 402 the logic may identify a public key of a first key pair to use for decrypting encrypted communications to the present device from the cryptographic processor/vehicle. For example, a private key for the first key pair may be stored on the cryptographic processor at manufacture of the cryptographic processor, and the present device may have access to a storage area at which a reciprocal public key of the first key pair is stored for use for decrypting communications from the cryptographic processor that were encrypted at the cryptographic processor using the first key pair's private key. In some embodiments, the public key for the first key pair may even be provided by the cryptographic processor itself during registration.

Also note that in addition to the public key of the first key pair for the cryptographic processor being identified, a second key pair may also be established/identified by the present device to use for encrypted communications to the cryptographic processor from the present device so that the cryptographic processor may decrypt such communications using the second key pair's public key. Thus, it is to be understood that, also at block 402, the logic may establish, create, and/or identify the second key pair and provide the public key for the second key pair to the cryptographic processor/vehicle for use in decrypting communications from the present device.

From block 402 the logic of FIG. 4 may move to block 404. At block 404 the logic may identify and/or sense one or more operational characteristics pertaining to the vehicle, based on data from one or more sensors, while the vehicle is operating adjacent to the present device so that the sensors may sense its characteristics. The data and/or operational characteristics derived therefrom may be stored in a relational database associating the particular vehicle with the operational characteristics/data.

As an example, the sensors for sensing operational characteristics may include vibration and sound sensors, such as the respective sensors 316, 318 described above. In this example, at block 404 a vibration and/or vibration frequency generated by the vehicle may be sensed, a vibration pattern generated by the vehicle may be sensed, a vibration amplitude for at least one vibration generated by the vehicle may be sensed, a sound and/or sound frequency or pitch generated by the vehicle may be sensed, a sound pattern generated by the vehicle may be sensed, and/or a sound amplitude for at least one sound generated by the vehicle may be sensed. In some embodiments, a weight sensor may also be used to sense the weight of the vehicle during this stage (for later identification of the vehicle based on a later-sensed weight being within a predefined tolerance of the weight sensed at block 404).

From block 404 the logic may move to block 406 where the logic may register the vehicle at least by storing data pertaining to the algorithms, key pairs, and/or operational characteristics in a relational database for later use for authentication. A digital certificate associated with the vehicle/cryptographic processor and/or the first keypair may also be stored. Also at block 406, the logic may associate a particular user with the algorithm(s), key pair(s), digital certificate, and/or operational characteristic(s) for a subsequent authentication of the vehicle and/or associated user. The logic may also do this using a relational database associating the particular user with such data.

The logic of FIG. 4 may then move from block 406 to decision diamond 408. At diamond 408 the logic may, after vehicle registration and/or at a later time, determine whether the vehicle is again sensed by a sensor communicating with the present device, and/or may determine whether authentication has otherwise been requested by the user/vehicle. For example, the vehicle may have been registered during an initial setup process, and then at a later time the vehicle may return to perform a transaction using the present device.

A negative determination at diamond 408 may cause the present device to continue making the determination thereat until an affirmative determination is made. The determination at diamond 408 may be made in the affirmative based on the vehicle being sensed by the sensor(s) and/or based on the vehicle transmitting a request for authentication. Responsive to an affirmative determination at diamond 408, the logic may proceed to block 410.

At block 410 the logic may transmit a challenge to the vehicle to be processed by the vehicle's cryptographic processor for the cryptographic processor to generate a response as set forth herein. The challenge may be transmitted wirelessly using the respective wireless communication transceivers on the present device and vehicle, which in some embodiments may be Bluetooth transceivers. From block 410 the logic may then move to block 412.

At block 412 the logic may receive back, via wireless communication, an encrypted digital certificate from the cryptographic processor and a response to the challenge, which may also be encrypted and generated by the cryptographic processor. The digital certificate may have been encrypted by the cryptographic processor using the cryptographic processor's private key from the first key pair referenced above, while the challenge response may have been encrypted by the cryptographic processor using the bank's public key from the second key pair referenced above. Accordingly, and also at block 412, the logic may decrypt the digital certificate using the cryptographic processor's public key from the first key pair and decrypt the challenge response using the bank's private key from the second key pair.

In other embodiments, at block 412 the logic may simply receive back the response encrypted with the cryptographic processor/vehicle's private key from the first key pair as digitally signed by the cryptographic processor/vehicle. In this example and also at block 412, the present device may decrypt the response with the public key it has stored from the first key pair, and verify the response is what is expected (such as the original challenge with values reversed, incremented, etc. for the response).

If decryption of one or both of the digital certificate and challenge response are unsuccessful, the logic may end or alternatively proceed to block 416, which will be described below. However, assuming successful decryption, the logic may proceed to decision diamond 414, where the logic may determine whether the challenge response is correct based on the challenge that was issued to the cryptographic processor and the response excepted to be received back based on the response algorithm expected to be used by the cryptographic processor.

Responsive to a negative determination at diamond 414, the logic may proceed to block 416. At block 416 the logic may determine that authentication has failed and lock the present device and/or any other devices associated with the bank from being used one or both by the user associated with the vehicle and/or while the same vehicle is still sensed as being present.

However, responsive to an affirmative determination at diamond 414, the logic may instead proceed to block 418. At block 418 the logic may receive sensor data from one or more sensors pertaining to operational characteristics of the vehicle, such as the sound and vibration characteristics described herein. The logic may then move to decision diamond 420 where the logic may access the relational database that associates the various operational characteristics/sensor data for the vehicle with the vehicle itself (e.g., via a vehicle identification number), and then determine whether the data received at block 418 matches the data in the relational database for the vehicle and/or whether the operational characteristics derived from such data match the operational characteristics in the relational database for the vehicle. In some embodiments, the match need not be exact but may be a match within a predefined tolerance.

A negative determination at diamond 420 may cause the logic to move to block 416 and take actions thereat as described above. However, responsive to an affirmative determination at diamond 420, the logic may move to block 422. At block 422 the logic may determine that authentication of the vehicle and hence corresponding user has been successful and, based on that, enable use of the present device by the user while (and in some embodiments, only while) the same vehicle remains present adjacent to the present device as may be determined based on input from one or more of the sensors communicating with the present device. Then, based on the present device being enabled for use by the user, the present device may permit authentication of the user using his or her ATM card and associated personal identification number (PIN) so that the user may conduct a transaction using the present device. Once the user drives away in his or her vehicle, the present device may then be locked again such that it cannot be used to conduct a transaction until another registered vehicle is authenticated.

Figure 5:
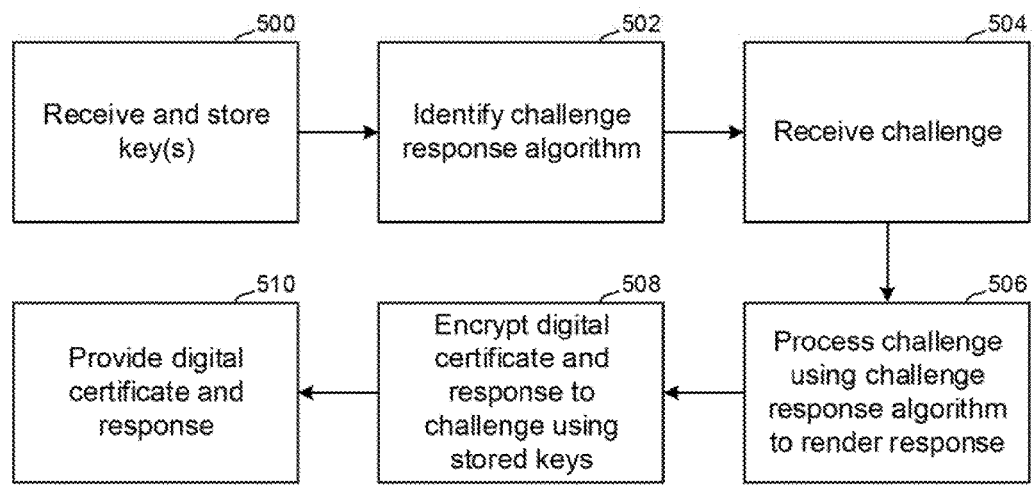

Now referring to FIG. 5, it shows example logic that may be executed by a cryptographic processor in accordance with present principles. Beginning at block 500, the logic may receive and store one or more encryption keys during a configuration/registration stage of the cryptographic processor in accordance with present principles. E.g., using the example above regarding the bank, at block 500 the logic may receive its own private key and also the public key for the bank/bank's device. From block 500 the logic may proceed to block 502 where, also during a configuration/registration stage, the logic may identify a challenge response algorithm to use in accordance with present principles.

Proceeding from the configuration/registration stage to an authentication stage, the logic may move to block 504 where the logic may (e.g., at a later time) receive a challenge from another device. Responsive to receipt of the challenge, the logic may move to block 506 where the logic may process the challenge using the response algorithm identified at block 502 and render a challenge response using the response algorithm.

Responsive rendering a challenge response, the logic may move to block 508 where the logic may encrypt a digital certificate for the cryptographic processor using the cryptographic processor's private key and encrypt the challenge response using the stored public key (e.g., for the bank in the bank example). The logic may then move to block 510 where the logic may provide the encrypted digital certificate and challenge response directly to the bank via a wireless transceiver on the cryptographic processor or via a wireless transceiver on the vehicle that is separate from the cryptographic processor.

Figure 6:
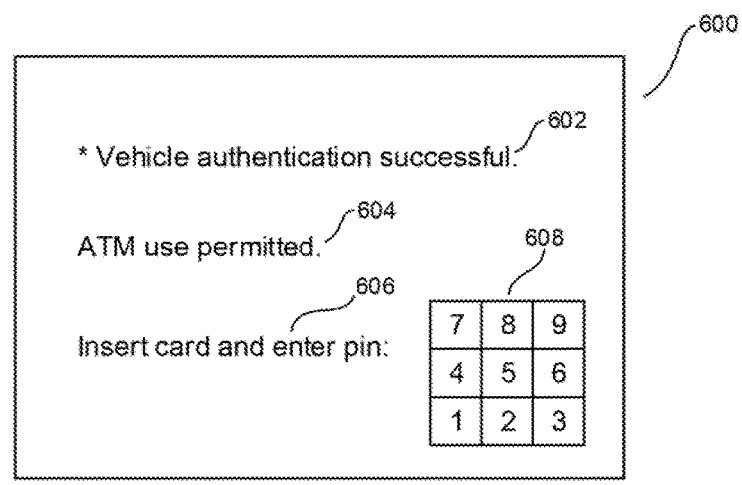
FIGS. 6-8 are example user interfaces (UIs) in accordance with present principles.

Referring now to FIG. 6 and again using the bank example, it shows an example user interface (UI) 600 that may be presented on the display of the bank's ATM in accordance with present principles. The UI 600 may be presented while the vehicle is adjacent to the ATM and responsive to vehicle authentication being successful as described herein, such as based on one or both of a correct challenge response being provided and the operational characteristics for the vehicle matching stored characteristics.

The UI 600 may include an indication 602 that authentication of the user's vehicle is successful. The UI 600 may also include an indication 604 that use of the ATM is permitted. Still further, the UI 600 may include a prompt 606 for the user to insert his or her ATM card and enter the associated PIN using keypad 608.

Figure 7:
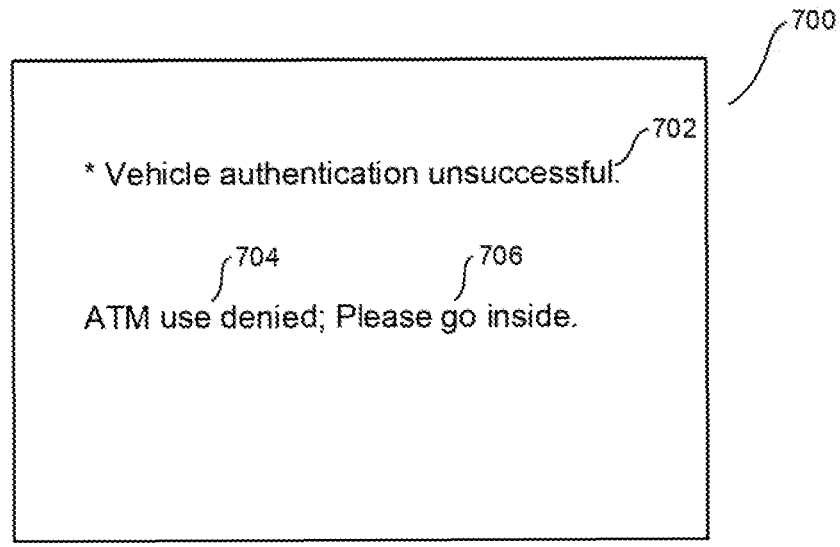

FIG. 7 also shows an example user interface (UI) 700 that may be presented on the display of the bank's ATM in accordance with present principles. In contrast to FIG. 6, the UI 700 may be presented responsive to authentication of the vehicle being unsuccessful. Accordingly, the UI 700 includes an indication 702 indicating as much, as well as an indication 704 that use of the bank's device is being denied and an instruction 706 for the user to go inside the bank instead to conduct a transaction inside where a person may be able to verify the identity of the user.

Additionally, it is to be understood that responsive to unsuccessful authentication, one or more limitations may be placed on the user's account and these limitations may be indicated on the UI 700 as well. For example, one such limitation may be a maximum withdrawal amount of $20 (e.g., within a predefined period of time) at any ATM associated with the establishment until a successful authentication is performed and/or until the user otherwise verifies his or her identity. This may allow the user to still get some money if they're in a friend's car or a rental, for example.

Figure 8:
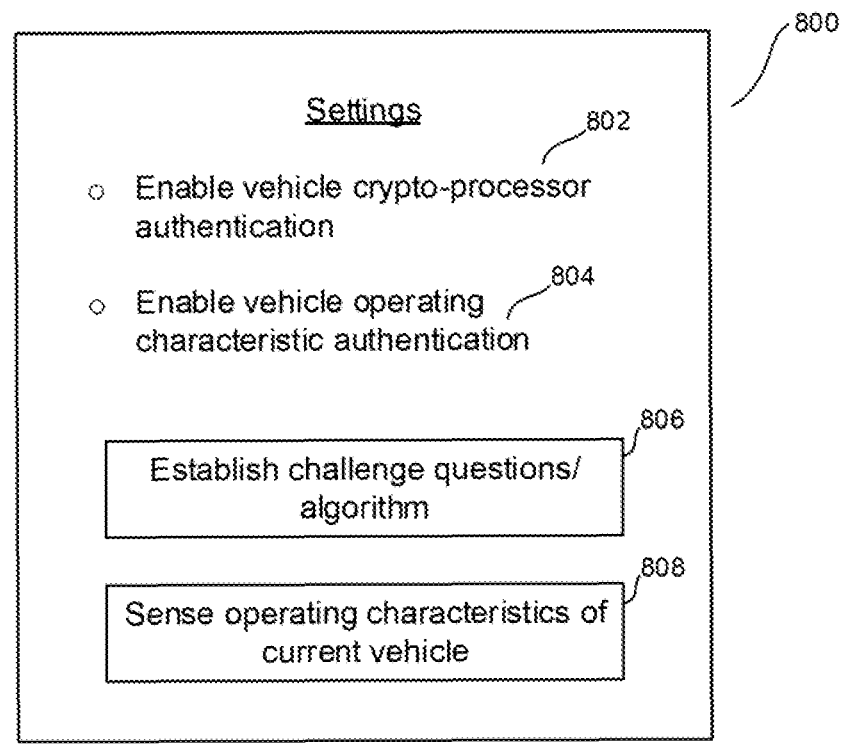

Referring now to FIG. 8, it shows an example UI 800 presentable on the display of the bank's device for configuring settings of the device in accordance with present principles. The UI 800 may include a first option 802 selectable using the radio button shown adjacent to the option 802 to enable authentication based on communication with a cryptographic processor as set forth herein. The UI 800 may also include a second option 804 selectable using the radio button shown adjacent to the option 804 to enable authentication based on identification of vehicle operating characteristics as set forth herein.

Additionally, in some embodiments the UI 800 may include a selector 806 that is selectable to establish one or more challenge questions and responses, and/or corresponding challenge question and response algorithms, for use in accordance with present principles. Further, the UI 800 may include a selector 808 that is selectable to initiate a configuration/registration stage as set forth herein to, e.g., sense operating characteristics of a vehicle that is currently present adjacent to the device.

Before concluding, it is to be understood that although a software application for undertaking present principles may be vended with a device such as the system 100, present principles apply in instances where such an application is downloaded from a server to a device over a network such as the Internet. Furthermore, present principles apply in instances where such an application is included on a computer readable storage medium that is being vended and/or provided, where the computer readable storage medium is not a transitory signal and/or a signal per se.

It is to be understood that whilst present principals have been described with reference to some example embodiments, these are not intended to be limiting, and that various alternative arrangements may be used to implement the subject matter claimed herein. Components included in one embodiment can be used in other embodiments in any appropriate combination. For example, any of the various components described herein and/or depicted in the Figures may be combined, interchanged or excluded from other embodiments.

What is claimed is:

1. A method, comprising:
   disposing a cryptographic processor on a vehicle;
   providing program instructions for the cryptographic processor to provide, via the vehicle, authentication information to a device separate from the vehicle; and
   authenticating, using the device, the vehicle based on receipt of the authentication information and based on at least one vibration characteristic of the vehicle, or at least one sound characteristic of the vehicle, or at least one vibration and sound characteristic of the vehicle.

2. The method of claim 1, wherein the cryptographic processor comprises program instructions to encrypt, using an encryption key, a communication to the device to provide the authentication information to the device.

3. The method of claim 1, comprising:
   disposing a wireless communication transceiver on the vehicle that enables the vehicle to communicate the authentication information from the cryptographic processor to the device via the wireless communication transceiver.

4. The method of claim 1, wherein the at least one characteristic comprises at least one of: paint color of the vehicle, or a vehicle identification number for the vehicle.

5. The method of claim 1, comprising:
   receiving data from a sensor, wherein the data indicates at least one operating characteristic of the vehicle, and wherein the at least one operating characteristic comprises one or more of: a vibration generated by the vehicle, a vibration pattern generated by the vehicle, a vibration amplitude for at least one vibration generated by the vehicle, a sound generated by the vehicle, a sound pattern generated by the vehicle, and a sound amplitude for at least one sound generated by the vehicle; and
   authenticating the vehicle based on the data.

6. The method of claim 1, comprising:
   receiving data from a sensor, wherein the data indicates sound and vibration generated by the vehicle; and
   authenticating the vehicle based on the data.

7. The method of claim 1, wherein the cryptographic processor comprises program instructions to receive a request from the device and to determine a response to the request, the response at least in part establishing the authentication information.

8. The method of claim 7, wherein the cryptographic processor comprises program instructions to provide, with the response, a digital certificate encrypted with a predetermined key, the digital certificate at least in part establishing the authentication information.

9. The method of claim 8, comprising:
   disposing a wireless communication transceiver on the vehicle that enables the vehicle to communicate the authentication information from the cryptographic processor to the device via the wireless communication transceiver, wherein the response and digital certificate are provided to the device via the wireless communication transceiver.

10. A computer readable storage medium (CRSM) that is not a transitory signal, the computer readable storage medium comprising instructions executable by a processor to:
receive data pertaining to a vehicle, the data indicating atmospheric wave information emanating from the vehicle; and
perform authentication based on the data.

11. The CRSM of claim 10, wherein the data comprises data from a sensor that senses at least one operating characteristic of the vehicle, the data from the sensor pertaining to the at least one operating characteristic.

12. The CRSM of claim 10, wherein the atmospheric wave information comprises one or more of: a vibration generated by the vehicle, a vibration pattern generated by the vehicle, a vibration amplitude for at least one vibration generated by the vehicle, a sound generated by the vehicle, a sound pattern generated by the vehicle, and a sound amplitude for at least one sound generated by the vehicle.

13. The CRSM of claim 10, wherein the atmospheric wave information comprises data from one or more sensors that sense sound and vibration generated by the vehicle, and wherein the instructions are executable by the processor to:
receive data from the one or more sensors that pertains to sound and vibration generated by the vehicle; and
perform authentication based on the data from the one or more sensors.

14. The CRSM of claim 10, wherein the data indicates at least one of: paint color of the vehicle, or a vehicle identification number for the vehicle.

15. A device, comprising:
at least one processor; and
storage accessible to the at least one processor and comprising instructions executable by the at least one processor to:
receive data pertaining to a vehicle, the data indicating sound and/or vibration of the vehicle; and
perform authentication based on the data.

16. The device of claim 15, comprising one or more sensors that sense sound and vibration generated by the vehicle, and wherein the instructions are executable by the at least one processor to:
receive data from the one or more sensors that pertains to sound and vibration generated by the vehicle; and
perform authentication based on the data from the one or more sensors that pertains to sound and vibration generated by the vehicle.

17. The device of claim 15, wherein the data indicates a vehicle identification number (VIN) for the vehicle, and wherein the instructions are executable by the at least one processor to:
perform authentication based on the data indicating the VIN for the vehicle.

18. The device of claim 15, wherein the data comprises data indicating a weight of the vehicle, and wherein the instructions are executable by the at least one processor to:
perform authentication based on the data indicating the weight of the vehicle.

19. The device of claim 15, comprising a sensor that senses at least one operating characteristic of the vehicle, wherein the data comprises data from the sensor that senses at least one operating characteristic of the vehicle, the data from the sensor pertaining to the at least one operating characteristic.

20. The device of claim 19, wherein the data further comprises a paint color of the vehicle.

* * * * *